June 4, 1963

F. D. LAKINS ETAL 3,092,288

BAR FEED APPARATUS

Filed Sept. 10, 1958

INVENTORS
Franklin D. Lakins
Gerald B. Lanphere
BY
D. Emmett Thompson
ATTORNEY

FIG_3

INVENTORS
Franklin D. Lakins
Gerald B. Lanphere
BY
D. Emmett Thompson
ATTORNEY

June 4, 1963

F. D. LAKINS ETAL 3,092,288

BAR FEED APPARATUS

Filed Sept. 10, 1958

INVENTORS
Franklin D. Lakins
Gerald B. Lanphere
BY
D. Emmett Thompson
ATTORNEY

FIG_5_

FIG_8_

FIG_9_

INVENTORS
Franklin D. Lakins
Gerald B. Lanphere
BY
D. Emmett Thompson
ATTORNEY

FIG_10_

United States Patent Office 3,092,288
Patented June 4, 1963

3,092,288
BAR FEED APPARATUS
Franklin D. Lakins, Nedrow, and Gerald B. Lanphere, Syracuse, N.Y., assignors to Lipe-Rollway Corporation, Syracuse, N.Y., a corporation of New York
Filed Sept. 10, 1958, Ser. No. 760,207
2 Claims. (Cl. 221—298)

This invention relates to a bar feed apparatus of the type disclosed in Patent 2,595,522 issued on May 6, 1952 to B. C. Harney.

It is a general object of this invention to provide a new and improved automatic magazine loading bar feed apparatus.

It is another object of this invention to provide a new and improved portable magazine and delivery head for such bar feed apparatus wherein the head may be simply and conveniently attached to the frame in any desired position lengthwise of the frame.

Further, it is an object of this invention to provide magazine and delivery heads for such bar feed apparatus which may be simply and conveniently mounted on the frame of the bar feed apparatus in either a left-hand or right-hand position so as to permit loading of the bar stock from either side of the bar feed apparatus.

It is a further object of this invention to provide a new and improved magazine and delivery head for bar feed apparatus which head functions to open the bar feed guide tube and to simultaneously deliver a single stock bar to the open tube.

It is a further object of this invention to provide a new and improved pedestal support for the frame bar feed apparatus which pedestal may be simply and conveniently adjusted vertically to align or level the bar feed frame.

The invention consists in the novel features and in the combinations and constructions hereinafter set forth and claimed.

In describing this invention, reference is had to the accompanying drawings in which like characters designate corresponding parts in all the views.

Figures 1, 2:
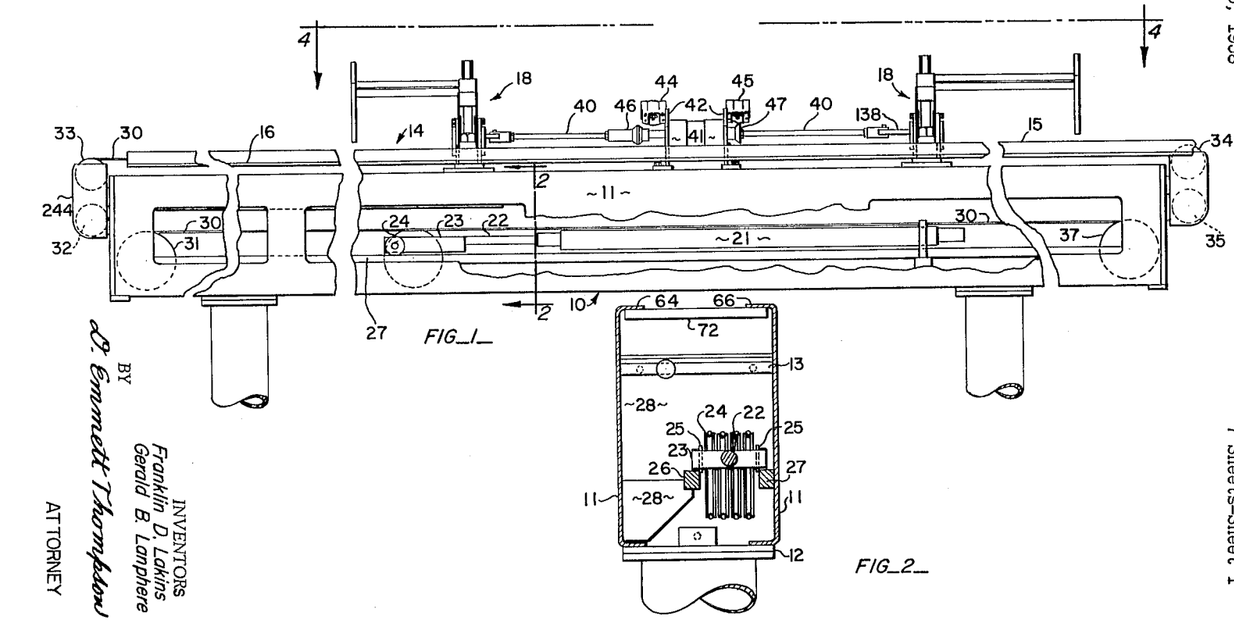
FIGURE 1 is a side elevational view of the bar feed apparatus.
FIGURE 2 is a cross-sectional view taken on line 2—2 of FIGURE 1.

The bar feed apparatus comprising this invention, as seen in FIGURES 1 and 2, is made up of a frame, generally indicated at 10 supported by a plurality of upstanding pedestal supports, spaced lengthwise along said frame. The frame 10 is made up of a pair of channel members 11 mounted to open toward each other in opposed confronting relation and affixed together by a plurality of lengthwise spaced lower cross braces 12 and upper cross braces 13.

Mounted on the frame 10 is a bar feed guide tube, generally indicated at 14, which comprises a magazine section 15 and a breech section 16. The magazine and breech sections are mounted on the top surface of the frame 10 in axial alignment with each other and are provided with a longitudinal slot 17 in the opposite side of the tube 14, as viewed in FIGURE 1.

The magazine section 15 of the tube is supported by a plurality of magazine and delivery heads, generally indicated at 18, two (2) of such heads being shown in FIGURE 1. Any number of heads 18 desired or necessary to support the magazine section 15 may be mounted in any selected position along the length of the frame 10 in a manner to be hereinafter described. The magazine section 15 of the guide tube 14 comprises a fixed section 19 and a movable section 20 (see FIGURES 5, 8 and 9), the movable section 20 being moved to and from open and closed positions by the heads 18 to permit bar stock to be fed into the open fixed section 19. A suitable feed and control mechanism, as described in Patent 2,595,522, functions to feed the bar stock in the tube 14 forwardly into the spindle of a bar working machine (not shown) located to the right of FIGURE 1. The feed mechanism comprises a main drive cylinder 21 of the double acting type having a piston rod 22 extending out of the cylinder 21. The forward end of the rod 22 is affixed to a tackle block assembly including a yoke 23 which carries four (4) pulleys 24 between the legs of the yoke 23.

As best seen in FIGURE 2, a pair of rollers 25 are mounted on the outer surfaces of the legs of the yoke 23 to ride on a pair of tracks 26 and 27 mounted within the frame 10 between the channel members 11. Track 27 is affixed to one of the side members 11 and track 26 is mounted on and supported by a plurality of plates 28 affixed to the other side member 11. As will be obvious the introduction of fluid pressure into the rear and forward ends of the magazine drive cylinder 21 will cause the tackle block assembly to move forwardly and rearwardly in the frame 10 along the tracks 26 and 27. As described in Patent 2,595,522, a drive cable 30 is suitably fixed within the frame 10 at its opposite ends (not shown) and is entrained from the rear fixed point over one of the pulleys 24 carried by the yoke 23 and from thence over a rear idler pulley 31 mounted in the rear or breech end of the frame 10, over a second pulley 24 carried by the yoke 23, and from thence about a pair of rear idler pulleys 32 and 33 mounted in a manner to be hereinafter described on the rearward end of the frame 10. The cable 30 then passes along the upper surface of the frame 10 adjacent the slot 17 formed in the tube 14 and over a forward pair of idler pulleys 34 and 35 suitably mounted on the forward or machine end of the frame 10, the cable then passing over a third pulley 24 carried by the yoke 23, around a front idler pulley 37 affixed in the forward end of the frame 10, around a fourth pulley 24 carried by the yoke 23, and affixed to the front fixed point (not shown) within the frame 10. As will be obvious by the connections just described, movement of the block and tackle assembly will cause the drive cable 30 to move forwardly and rearwardly along the upper surface of the frame 10 to move a stock pusher, received within the guide tube 14 and connected to cable 30 by a suitable connection (not shown) extending through the slot 17, forwardly and rearwardly within the tube 14.

The magazine and delivery heads 18 are interconnected by a pair of rods 40 connected to an actuating cylinder 41 mounted on a pair of upstanding brackets 42 on the upper surface of the frame 10. A pair of valves 44 and 45 are mounted on the upper ends of the brackets 42 to be actuated by a pair of cylinder actuators 46 and 47 carried by the rods 40 and in turn connected to the piston rods of the cylinder 41. Cylinder 41 is of the double acting type, and as described in Patent 2,595,522, when the stock pusher in the tube 14 has completely fed out the bar stock and has returned to the breech section 16, a valve (not shown) is actuated by the yoke 23 to introduce fluid pressure into the rear or left-hand end of the cylinder 41, causing the rods 40 to be shifted to the right, as viewed in FIGURE 1. This motion is transmitted by means to be hereinafter described to the delivery heads 18 to open the magazine section 15 and deliver a fresh or new piece of bar stock to the fixed section 19 of the tube 14. This movement causes actuator 46 to open valve 44, which is a pilot valve connected through a line to a master reversing valve (not shown) and the valve 44 functions to cause the reversing valve to reverse or shift to feed air through a suitable connection to the right-hand or forward end of cylinder 41, thus causing the rods 40 to be moved to the left, FIGURE 1, thus closing the magazine section 15 of the tube 14 and returning the rods 40 to the position shown in FIGURE 1. This return motion of the rods 40 causes the actuator 47 to open the valve 45 which is connected in the line furnishing pressure to the forward or right-hand end of the main cylinder 21 and functions when activated to admit pressure to the main drive cylinder to move the piston rod 22 and the yoke 23 of the block and tackle assembly to the left of FIGURE 1 to feed the freshly loaded bar stock forwardly in the tube 14, as is described in Patent 2,595,522. The feed and control mechanism just described is identical to that disclosed in Patent 2,595,522, and comprises no part of this invention.

Referring again to FIGURE 2, it will be seen that the channel members 11 are formed at their upper ends with a pair of inwardly extending flanges 64 and 66. The heads 18, shown in detail in FIGURE 5, include a base plate 68 which is affixed to the upper surface of the flanges 64 and 66 by a plurality of bolts 70 which extend through the plate 68 and into a pair of clamp bars 72 which are threaded to receive the bolts 70 so as to removably affix the heads to the flanges 64 and 66. The plate 68 is provided with four (4) corner leveling screws 74 which extend through the plate 68 and into engagement with the upper surface of the flanges 64 and 66 to level the head 18 on the frame 10 prior to the clamping of the head on the frame. As will be obvious by the construction just described, as many or as few heads 18, as are desired or necessary to support the guide tube 14, may be mounted on the frame 10 in any adjusted position lengthwise and cross-wise of the frame 10.

Figure 5:
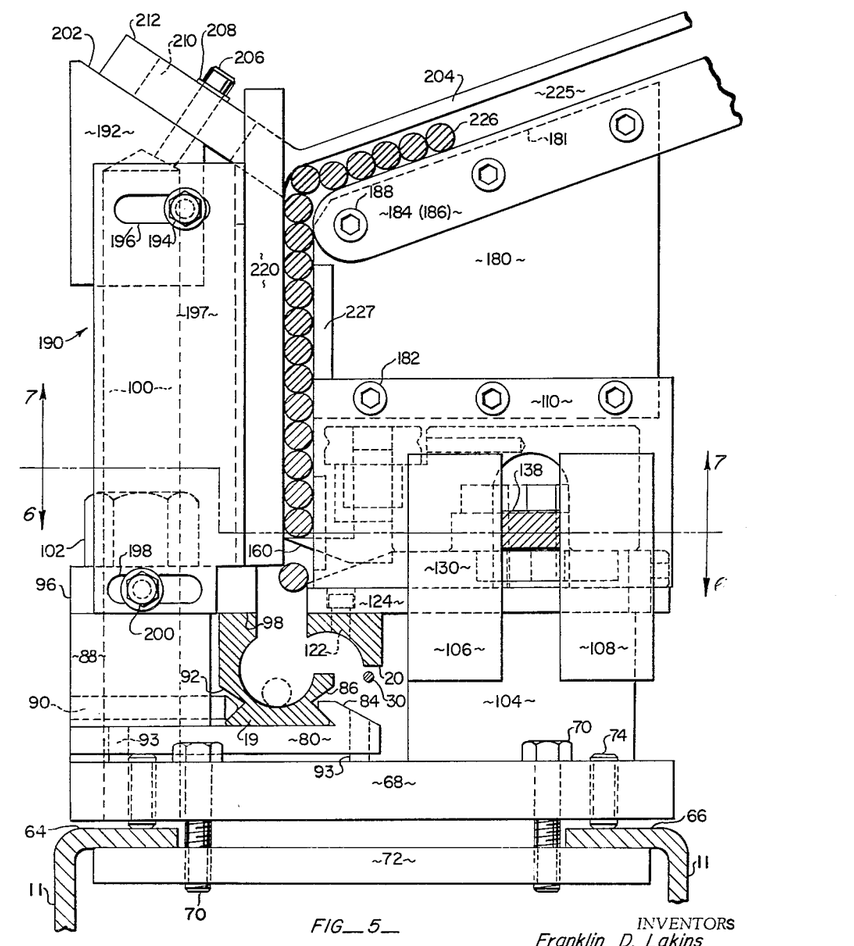
FIGURE 5 is an elevational sectional view taken approximately on line 5—5 of FIGURE 4.

Mounted on the left hand side of the plate 68, as viewed in FIGURE 5, is a lower clamping plate 80 for clamping the fixed section 19 of the bar feed guide tube 14. The plate 80 is formed with a lengthwise extending finger 84 which cooperates with a groove 86 formed in the fixed section 19 to clamp the fixed section against sidewise movement on the plate 80. A spacing block 88 is mounted on the plate 80 and carries a pair of clamping screws 90 which are received in a groove 92 formed in the side of the fixed tube section 19 opposite the groove 86 to receive the nose of the screws to cooperate with finger 84 to fixedly clamp tube section 19 on the plate 80. The plate 80 is provided with four (4) leveling or adjusting feet 93 which serve to facilitate and permit vertical adjustment of the plate 80 to compensate for any warpage, or the like, of the tube section 19.

Figure 6:
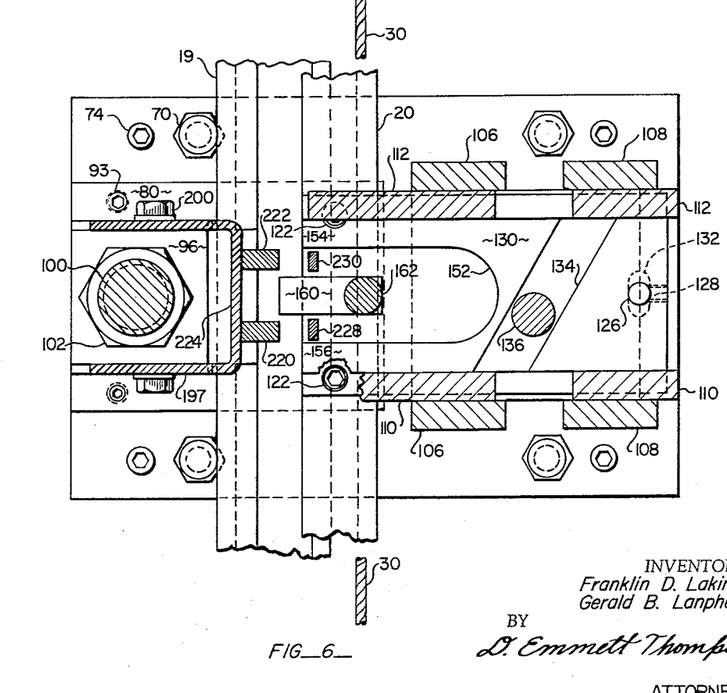
FIGURES 6 and 7 are sectional views taken on lines 6—6, 7—7 of FIGURE 5.
Figure 7:
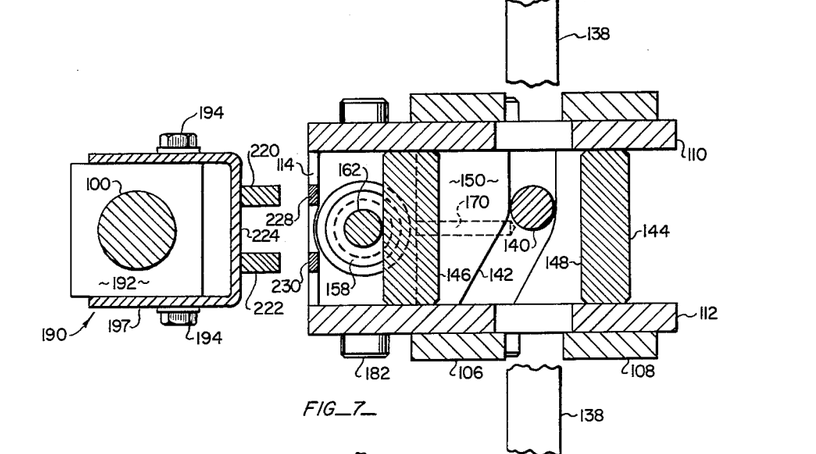

A third clamping block 96 is supported on the upper surface of the block 88 and extends inwardly beyond the block 88 to overhang the upper edge 98 of tube section 19. Blocks 96, 88 and plate 80 are clamped to the base plate by means of a bolt 100 threadedly mounted in the plate 68 and a clamp nut 102 threadedly mounted on the bolt 100 and rotated into clamping engagement with the block 96 to clamp blocks 96, 88 and plate 80 to plate 68, all whereby the fixed tube section 19 is held in an adjusted position on the base plate 68 against sidewise and vertical displacement. The right-hand end of base plate 68, as viewed in FIGURE 5, has a block 104 affixed thereto and a pair of arms 106, 108 are affixed on each side of the block 104 and extend upwardly therefrom (see also FIGURES 6 and 7). A pair of plates 110, 112 are affixed to the inner surfaces of the arms 106 and 108 in upwardly spaced relation to the block 104, and a cross piece 114 is affixed between the forward ends of plates 110 and 112 (see FIGURE 10) for a purpose to be hereinafter described.

Movable feed tube section 20 is supported by means of a pair of bolts 122 on the forward end of a plate 124 mounted for sliding movement on the upper surface of the block 104 between the pairs of arms 106, 108 (see FIGURES 5, 6, 8 and 9). Plate 124 is suitably affixed by means of a pin 126 and a set screw 128 to a slide support 130 whereby support 130 and plate 124 move together on the upper surface of block 104, the pin 126 being received in an oblong aperture 132 in the plate 24 to compensate for any misalignment between the plate 124 and the slide 130, see FIGURE 6.

Movement of the slide 130 is effectuated by means of a cam track 134 formed in the upper surface of the slide 130 extending diagonally across the slide 130. A roller 136 carried by an actuating bar 138 is received in the track 134. The bar is suitably connected to rods 40 and serves to cause movement of the slide 130 when the roller 136 is moved through the track 134.

A second roller 140 is mounted on the upper surface of the bar 138 and is received in a cam track 142 formed on the undersurface of a slide block 144. As viewed in FIGURE 7, cam track 142 is partially diagonal and partially straight through the block 144 whereby to effectuate movement of the block 144 upon movement of the roller 140 in the track 142. The underside of block 144 is formed with an oversized notch having sidewalls 146 and 148 and a topwall 150 whereby to entirely receive the bar 138 within the confines of the notch in order to permit the block 144 to move forwardly and rearwardly in a direction normal to the length of the bar 138 as the roller 140 moves through the cam track 142 which is formed in the upper surface 150 of the notch.

By reason of the configuration of the cam tracks 134 and 142, the slide 130 and block 144 move in timed relation and in opposite directions upon movement of the bar 138.

The forward end of the slide 130 is formed with a bifurcation 152 to form a pair of supporting fingers 154, 156. The forward portion of the block 144 is formed with a boss 158 suitably apertured to receive a separating finger 160 formed with an upwardly extending threaded shank 162. The shank 162 is threadedly connected to a depending sleeve 164 formed on a wheel 166 whereby the vertical position of the finger 160 in the boss 158 may be adjusted by rotating the wheel 166. The finger 160 is fixed in its vertically adjusted position by means of a pin 168 received in an aperture 170 formed in the block 144 and urged outwardly by reason of a compression spring 172 also received in the aperture 170, into engagement with suitable notches or the like, formed on the periphery of the wheel 166.

Figure 10:
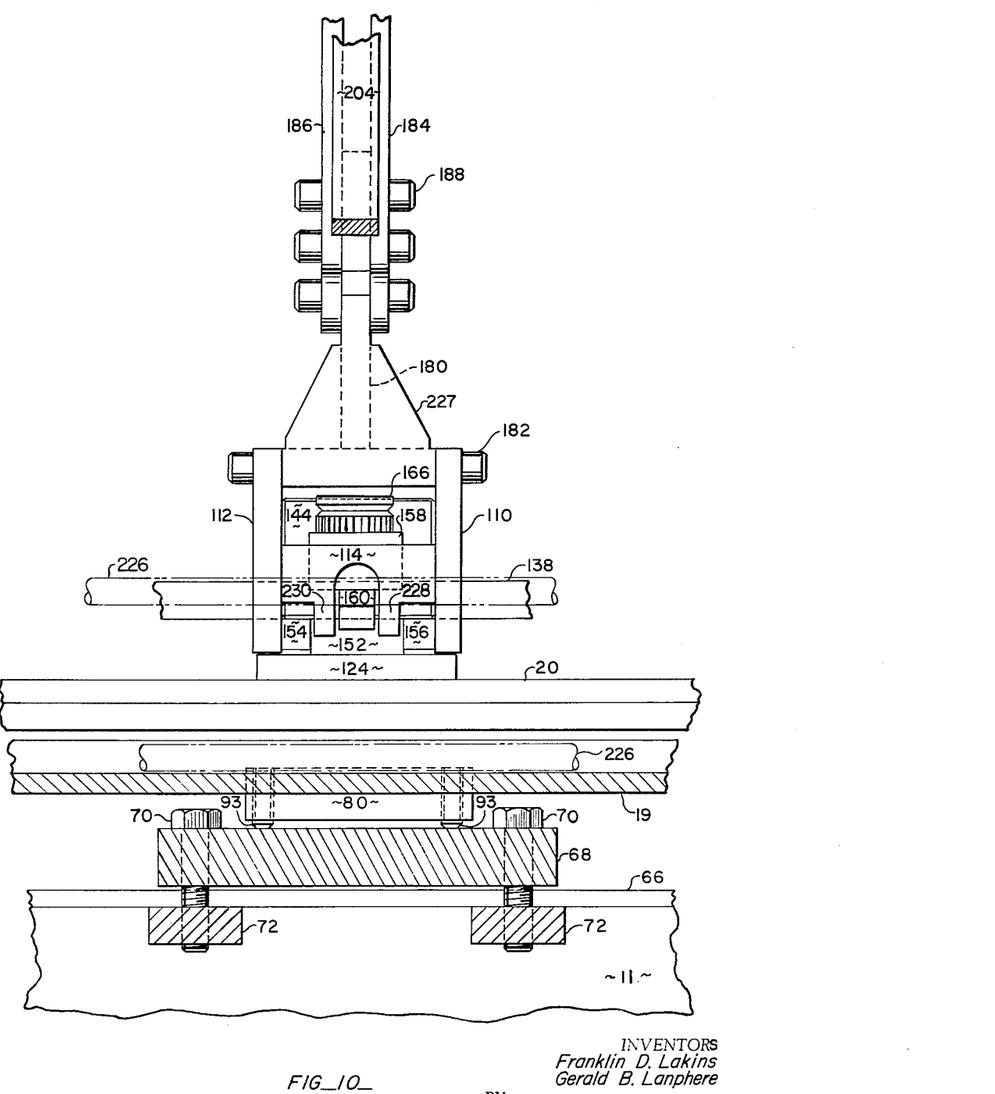
FIGURE 10 is a view taken on line 10—10 of FIGURE 9.

A T-shaped block 180 is supported by a plurality of bolts 182 between the upper ends of the side plates 110 and 112, see FIGURES 5 and 10. The upper end of the block 180 is formed with a downwardly sloping surface 181 and a pair of lower supporting or guide rails 184 and 186 are mounted by means of bolts 188 along the upper edge of block 180 parallel with the slope of the surface 181.

A U-shaped member 190 extends upwardly from the base plate 68 opposite the block 180. A block 192 is mounted on the upper end of the bolt 100 and is provided with a pair of apertures to receive a pair of bolts 194 which extend through a pair of upper slots 196 formed in the legs 197 to affix the upper end of the member 190 to the block 192. A similar pair of slots 198 are formed adjacent the lower ends of the legs 197 in the member 190 to receive a pair of bolts 200 which extend through the slots 198 and into the clamping block 96 whereby the U-shaped member 190 is adjustably mounted for inner and outer movement toward and away from the block 180.

The upper end of block 192 is formed with a sloping surface 202 and an upper guide bar 204 having a slope parallel to the slope of the guide rails 184 and 186 is mounted on the surface 202 of the block 192 by means of a bolt 206.

The bolt 206 is received through an elongated slot 210 formed in the portion 212 of guide bar 204 and the bolt 206 is threadedly mounted in the block 192 whereby the spacing of the bar 204 from the rails 184 and 186 may be varied to accommodate bar stock of various diameters. A pair of vertically extending guide rails 220 and 222 are affixed to the bight portion 224 of the U-shaped member 190. A delivery magazine 225 is thus formed by lower guide rails 184 and 186, upper guide rail 204 and forward guide rails 220 and 222 which cooperate with the forward surface 227 of the block 180, forward edge of the blocks 110 and 112, and the cross piece 114 carried by the side plates 110 and 112 to guide a plurality of stock bars 226 into vertical position above the separating finger 160. As will be obvious from the structure which forms the magazine 225, the dimensions of the magazine may be varied to compensate for larger or smaller stock bars 226 as is necessary.

Correspondingly, the fixed and movable sections of the magazine section 15 of the stock bar guide feed tube 14 may be removed and replaced by larger or smaller sections to also accommodate different diameter stock bars.

Figure 8:
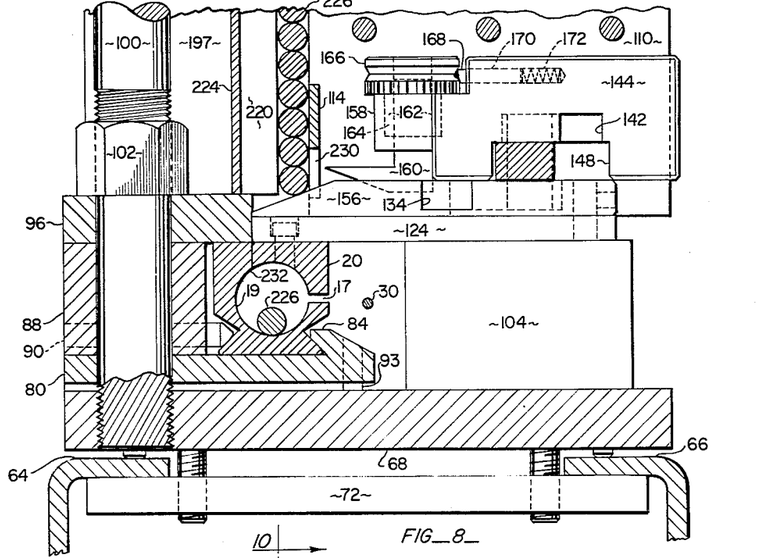
FIGURES 8 and 9 are views similar to FIGURE 5 with parts omitted and parts in section showing the apparatus in two different operating positions.

In operation the stock bars 226 are loaded in the magazine 225 so that the lowermost stock bar rests on the supporting fingers 154, 156, as shown in FIGURE 8. Wheel 166 is rotated to vertically adjust the separating finger 160 to a position where the point formed by the sloped undersurface of the finger 160 is aligned with the tangential line between the lowermost stock bar 226 and the next adjacent stock bar, whereby when the finger 160 is moved inwardly the lowermost stock bar will be separated from the remaining bars in the magazine 225 which are then supported in the magazine by finger 160. The cylinder 41 is operated in a timed relation by the control and drive mechanism as previously set forth, and when a stock bar in the guide tube 14 has been completely fed into the spindle of the bar working machine and the stock bar pusher structure has been returned to the breech section 16, the cylinder 41 is supplied with pressure at the rear or left side of the piston, as viewed in FIGURE 1, whereby to move the rods 40 and the actuating bars 138 which are connected to the rods 40 to the right, as viewed in FIGURE 1.

The motion of the actuating bars 138 is transmitted through rollers 136 and 140 to the slide 130 and block 144. The configuration of the cam tracks 134 and 142 in the slide 130 and block 144 respectively, causes the separating finger 160 to first move forwardly into the position, shown in FIGURE 9, wherein the lowermost stock bar 226 is separated from the remaining stock bars which are then supported on the upper surface of the separating finger 160. Concurrently, the supporting fingers 154 and 156 are moved rearwardly into the position, shown in FIGURE 9, whereby the lowermost stock bar is permitted to roll off the sloping upper surfaces of the fingers 154 and 156 into the open fixed section 19 of the guide tube.

Figure 9:
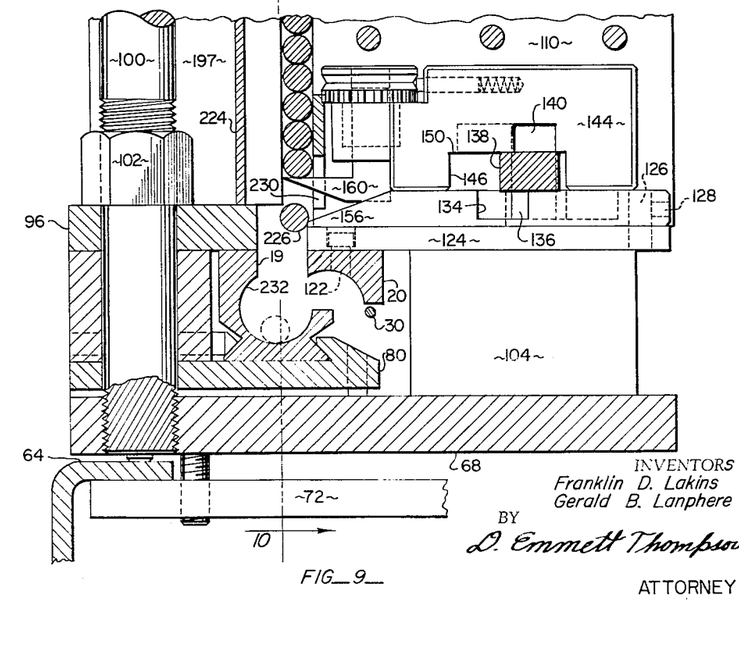

Concurrently, with the rearward motion of the slide 130 and fingers 154 and 156 the plate 124 carrying the movable section 20 of the guide tube causes the movable section to be moved into the position, shown in FIGURE 9, whereby to permit entry of the lowermost stock bar into the open tube. Thereafter the pressure is exhausted from the rear or left end of the cylinder 41 and introduced into the right or front of the cylinder 41, as viewed in FIGURE 1, thereby causing the rods 40 and actuating bars 138 to return to their initial position which in turn causes the slide 130 and movable tube section 20 and supporting plate 124 to return to the position, shown in FIGURE 8, wherein the guide tube is closed and the stock bars are supported on the fingers 154 and 156. Thereafter the pusher structure commences movement forwardly in the tube 14 to feed the freshly loaded stock bar into the spindle of the bar working machine.

The lowermost bar 226 supported by the fingers 154 and 156 is held against rearward movement with the fingers 154 and 156 during the delivery operation just described by means of the depending fingers 228 and 230 (see FIGURE 10) carried by the cross piece 114 between the side plates 110 and 112. As will be obvious, the upper surfaces of the fingers 154 and 156 and the depending fingers 228 and 230 on the cross piece 114 impart a counterclockwise roll to the lowermost stock bar upon movement of the slide 130 rearwardly. The fixed section of the guide tube opens to the right, as viewed in FIGURES 5, 8 and 9, and is so formed that the lowermost stock bar delivered to the fixed section cannot roll out of the fixed section due to the counter-clockwise motion of the stock bar because of the high left-hand sidewall 232 formed in the fixed section 19.

Figure 3:
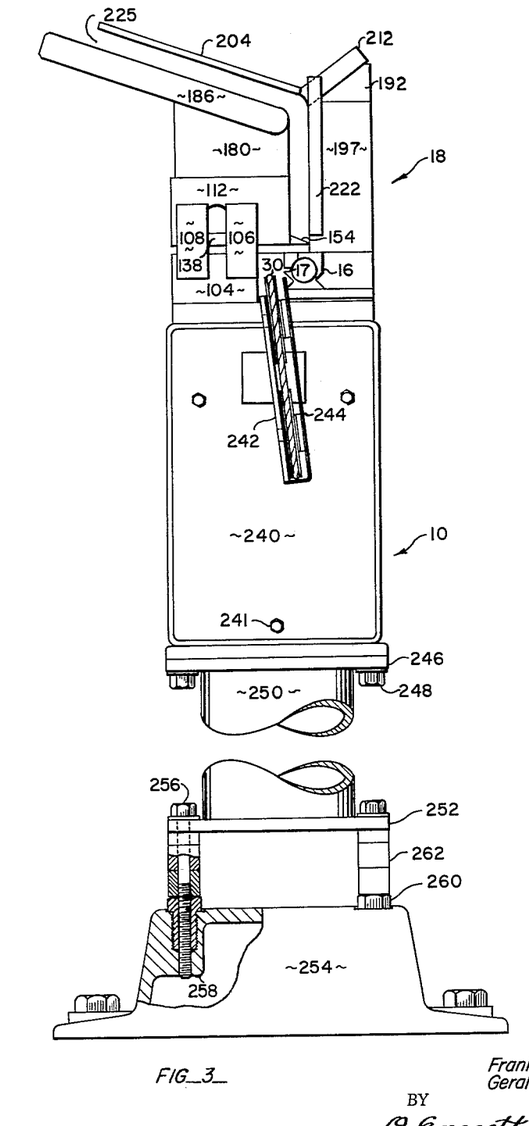
FIGURE 3 is an end enlarged elevational view with parts broken away and parts in section looking to the right of FIGURE 1.

Referring to FIGURE 3, it will be seen that the rear or breech end of the frame 10 is closed with a rear plate 240 which is affixed by a plurality of cap screws 241, or the like, to the frame 10. The rear idler pulleys are supported by a plate 242 mounted on the end plate 240 and are enclosed by a cover 244. As best seen in FIGURE 3, the supporting plate 242 for the rear idler pulleys is so positioned on the plate 240 so as to center the upper run of the drive cable 30 along the top surface of the frame 10. Accordingly, by virtue of the clamping plates 72 and clamp bolts 70 the heads 18 may be mounted with the magazine 225 opening to the left, as shown in FIGURE 2, or to the right, and in either position the guide tube 14 will be carried by the heads 18 with the longitudinal slot 17 adjacent the upper run of the drive cable 30 to receive the connection (not shown) through the slot 17 to the stock bar pusher structure. By this feature, as will be obvious, the apparatus may be set up to load stock bars into the magazine 225 from the side of the apparatus most convenient for the operator.

As will also be obvious the rear plate 240 may be removed from the end of the frame 10 and additional supplemental frame sections may be affixed to the rear or breech end of the frame 10 to lengthen the over-all length of the frame 10 to accommodate bar stock having a length greater than the main section of the frame 10, the plate 240 being affixed to the rear end of the supplemental or additional frame sections in the same manner as described in connection with the main frame section 10.

The frame 10 is supported by pedestals which comprise supporting plates 246 which are affixed to the cross plates 12 mounted on the lower ends of the channels 11 by means of bolts 248. Affixed to the upper supporting plate 246 and depending therefrom is a leg portion 250 which is affixed to a lower supporting plate 252. The lower supporting plate is affixed to a support shoe or pad 254 by bolts 256. The bolts 256 are threaded into engagement with apertured threaded bosses 258 formed in the pad 254. The lower supporting plate 252, leg 250, and upper supporting plate 246, and in turn plates 12 and frame 10 may be vertically adjusted to level the frame 10 and align it with the spindle of the bar working machine by virtue of a plurality of adjusting sleeve bolts 260.

The bolts 260 are threaded into apertures concentric with the threaded apertures which receive the bolts 256 in the bosses 258. The sleeve bolts 260 have a straight center bore through which the bolts 256 are received. The sleeve bolts 260 may therefore be adjusted in the bosses 258 by threading them into or out of the bosses 258 to the desired vertical position. A plurality of spacers 262 are carried by the bolts 256 between the underside of the plate 252 and the heads of the sleeve bolts 260 and serve to support the plate 252 in spaced relation to the pad 254. After adjusting the sleeve bolts 260 to the desired vertical position the bolts 256 are threaded into engagement with the bosses 258 to clamp the plate 252 and spacers 262 against the sleeve bolts 260 in the adjusted position on the pad 254. As will be obvious by the construction just described, the frame 10 may be simply and easily vertically adjusted to level and axially align the guide tube 14 carried by the frame 10 with the spindle of the bar working machine.

Figure 4:
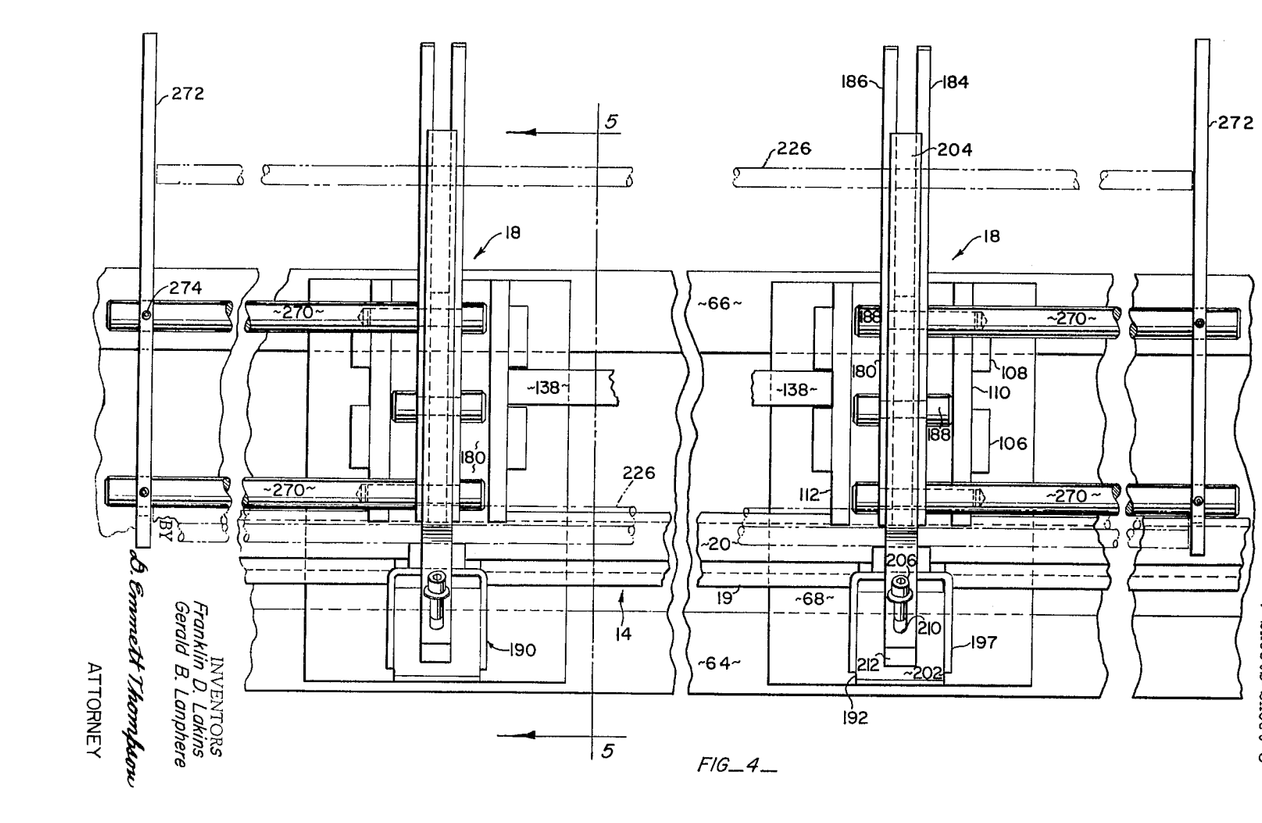
FIGURE 4 is an enlarged top plan view with parts omitted as indicated by line 4—4 of FIGURE 1.

As best seen in FIGURES 1 and 4, the bolts 188 supporting the lower guide rails 184 and 186 in the block 180 may also be utilized to support a pair of rods 270 which extend lengthwise along the frame 10. The rods 270 have end plates 272 affixed to their outer ends by means of set screws 274, as seen in FIGURE 4, and the end plates 272 serve to align the ends of the stock bars 226, shown in phantom lines on the heads 18 in order to render uniform the position at which the rear ends of the bars 226 are delivered into the guide tube 14. The end plates 272 are particularly advantageous when feeding stock bars 226 of short lengths or bars of varied or random lengths and serve, as just described, to facilitate the positioning of the rear or left-hand end of the bars, as viewed in FIGURE 4, in an even or aligned position with respect to the tube 14.

What we claim is:

1. A bar feed machine for use in conjunction with bar working machines comprising an elongated frame, a plurality of heads fixed to said frame in spaced relation therealong, a bar feed guide tube for guiding stock bars to the bar working machine, said guide tube consisting of a lower concave section extending lengthwise of said frame and being mounted in said heads, means for adjusting said lower guide tube section vertically relative to said heads, said guide tube also including an upper cover section, each of said heads having means for positioning and supporting a plurality of stock bars in vertical stack formation above said guide tube, bar feed means mounted in each of said heads for feeding stock bars successively from said stack to said guide tube, said feed means comprising a block mounted in each head at one side of said guide tube, a separating finger carried by said block, said block being movable laterally toward and from said stack to move said separating finger into and out of supporting engagement with the next to the lowermost bar in said stack, a slide mounted in each of said heads intermediate said block and said guide tube at the like side thereof, said upper cover section of said guide tube being connected to said slide, said slide being movable laterally towards said stack in position to support the lowermost bar in said stack and to position said upper cover section over said lower concave section of said tube, said slide being movable in a direction from said stack to move said cover section from over said lower section, and to release the lowermost bar for descent into the lower section of said tube, the confronting surfaces of said block and slide being formed with confronting cam tracks, a cam bar slidably mounted in each of said heads and being operable upon sliding movement to simultaneously move said block and slide in opposite directions, means connecting said cam bars for movement in unison, and means for adjusting said separating finger vertically relative to said block.

2. A bar feed structure as defined in claim 1 including means in each of said heads operable to detachably clamp said lower guide tube section to the heads.

References Cited in the file of this patent
UNITED STATES PATENTS

| | | |
|---|---|---|
| 923,554 | Mill | June 1, 1909 |
| 956,712 | Kruger | May 3, 1910 |
| 1,871,020 | Wyzenbeek | Aug. 9, 1932 |
| 1,877,693 | Rich | Sept. 13, 1932 |
| 1,956,999 | Rupple | May 1, 1934 |
| 2,577,203 | Mariotte | Dec. 4, 1951 |
| 2,583,414 | Chain | Jan. 22, 1952 |
| 2,587,886 | Penchoen | Mar. 4, 1952 |
| 2,595,522 | Harney | May 6, 1952 |
| 2,781,574 | Harney et al. | Feb. 19, 1957 |
| 2,896,379 | Herrmann | July 28, 1959 |
| 2,915,810 | Taylor et al. | Dec. 8, 1959 |